(No Model.)
G. C. THAYER.
WAGON BRAKE.
No. 389,777. Patented Sept. 18, 1888.
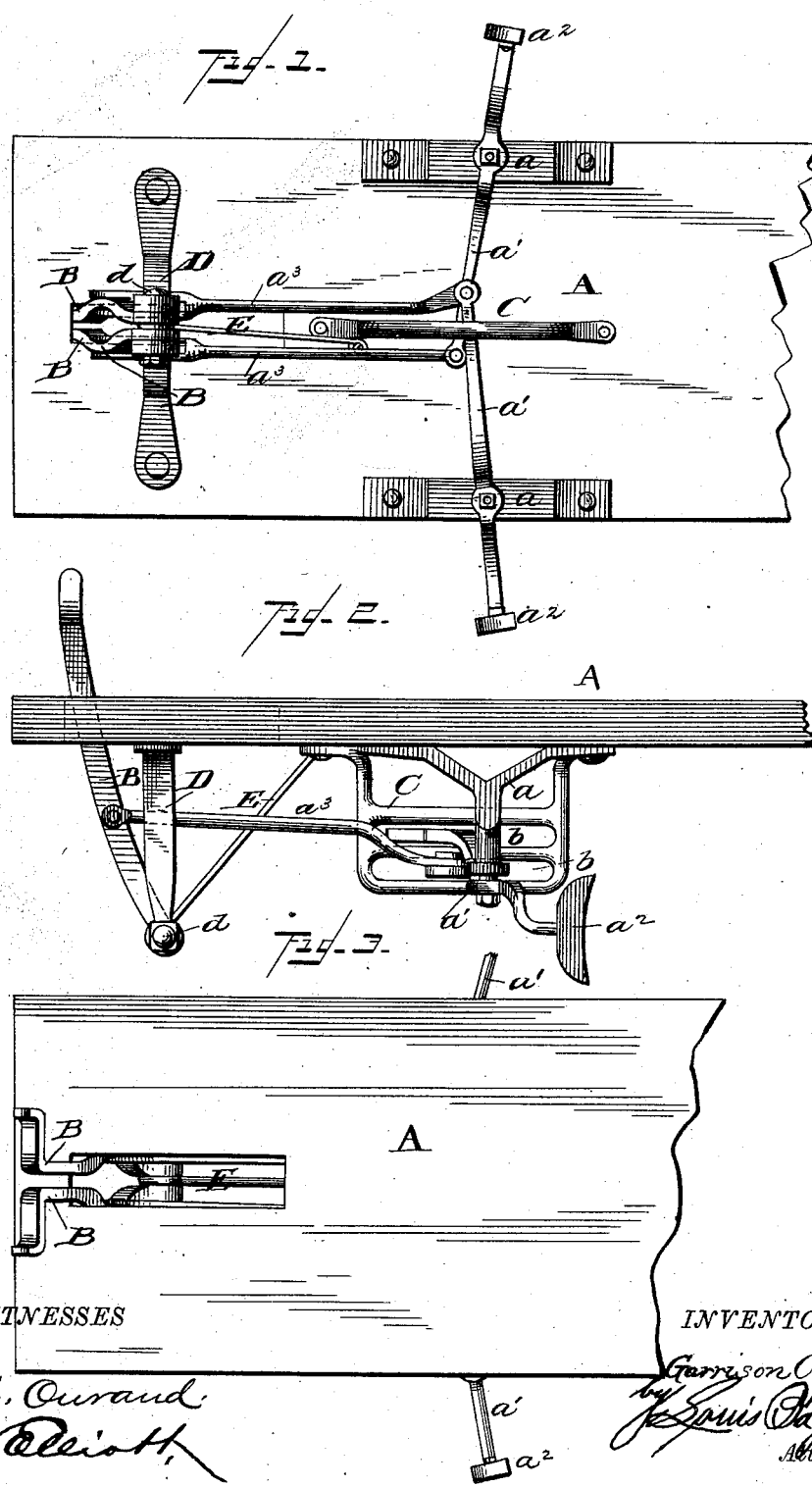
WITNESSES
INVENTOR
Garrison C. Thayer

UNITED STATES PATENT OFFICE.

GARRISON C. THAYER, OF PAWHUSKA, INDIAN TERRITORY.

WAGON-BRAKE.

SPECIFICATION forming part of Letters Patent No. 389,777, dated September 18, 1888.

Application filed June 13, 1888. Serial No. 276,918. (No model.)

*To all whom it may concern:*

Be it known that I, GARRISON C. THAYER, a citizen of the United States, and a resident of Pawhuska, Osage Nation, Indian Territory, have invented certain new and useful Improvements in Wagon-Brakes; and I do hereby declare that the following is a full, clear, and exact description of the invention, which will enable others skilled in the art to which it appertains to make and use the same.

This invention relates to wagon-brakes.

The object is to produce a brake for use on wagons of any description, that will be of such construction that either of the brakes may be used at will, or both in unison, thereby enabling a person to have perfect control of the wagon; furthermore, to produce a brake which shall be simple of construction, efficient and durable in use, and comparatively inexpensive of production.

With these objects in view the invention consists in a brake having two levers each operating an independent brake-shoe; furthermore, in the combination and operation of the various parts, whereby its objects are attained.

In the accompanying drawings, forming part of this specification, and in which like letters of reference indicate corresponding parts, Figure 1 is a bottom plan view of a part of a wagon-body, showing the brake-levers and the arms carrying the brake-shoes. Fig. 2 is a side elevation showing a standard in which the brake-lever arms work to prevent their locking, and thus prevent the perfect working of the device; and Fig. 3 is a top plan view, taken on the opposite of that shown in Fig. 1, showing levers for operating the brakes.

Referring to the drawings, A designates the bottom of an ordinary wagon, on each side of which is secured a standard, $a$, to which the brake-lever arms $a'$ are secured. To one end of each of these arms is secured a brake-shoe, $a^2$, and to the opposite end the levers $a^3$, which connect with the arms B, which operate the device.

C designates a standard, which is bolted to the under side of the wagon-body and is provided with two longitudinal slots, $b$, in which the brake-lever arms work, to prevent their becoming locked when the brake is operated.

D designates a standard, which is bolted to the bottom of the wagon at a point near the front end. To this standard are pivoted the arms B, the upper ends of which are bent to form a support for the feet of the person using the device.

E designates a brace, one end of which is secured to the wagon-floor and the other end to the bolt $d$, which holds the arms B in place. This brace acts not only as a support for the standard D, but also to prevent the arms B from grinding against each other at their pivotal point.

When the person driving wishes to apply the brakes, he has only to push either one or both of the arms B, and this will cause the brakes to apply themselves to the wheels. The advantage of this brake lies in the fact that should one of the brakes get out of order the driver may still have sufficient control of the wagon to prevent any accident while going downgrade.

Having thus fully described my invention, what I claim as new, and desire to secure by Letters Patent, is—

1. The herein-described brake, having two levers each operating an independent brake-shoe, substantially as described.

2. The combination, with the floor of a wagon, of two standards bolted thereto, each standard having an arm secured thereon, one end of the said arm having brake-shoes bolted to it and the other end the levers connecting with the arms for operating the said brakes, substantially as described.

3. The combination, with the floor of a wagon, of the standard C, having two longitudinal slots formed therein, in which the arms $a'$ work to prevent their locking when the brake is operated, substantially as described.

4. The combination of the standards $a$, the levers $a'$, mounted thereon, the standard C, in which the said levers work to prevent their locking when the brake is operated, the levers $a^3$, connecting with the levers $a'$ and operated by the arms B, and the brace E, one end of which is bolted to the floor of the wagon and the other end to the bolt on which the said arms are pivoted, whereby they will be prevented from grinding against each other, substantially as described.

In testimony that I claim the foregoing as my own I have hereunto affixed my signature in presence of two witnesses.

GARRISON C. THAYER.

Witnesses:
GEORGE S. HARTLEY,
MAX TATERKA.